(12) United States Patent
Singleton

(10) Patent No.: US 9,084,393 B1
(45) Date of Patent: Jul. 21, 2015

(54) LAWN EQUIPMENT ATTACHMENT

(71) Applicant: Andrew M. Singleton, Manchester, MO (US)

(72) Inventor: Andrew M. Singleton, Manchester, MO (US)

( * ) Notice: Subject to any disclaimer, the term of this patent is extended or adjusted under 35 U.S.C. 154(b) by 270 days.

(21) Appl. No.: 13/792,979

(22) Filed: Mar. 11, 2013

Related U.S. Application Data

(60) Provisional application No. 61/616,042, filed on Mar. 27, 2012.

(51) Int. Cl.
*A01D 43/00* (2006.01)
*A01D 43/063* (2006.01)

(52) U.S. Cl.
CPC .................... *A01D 43/063* (2013.01)

(58) Field of Classification Search
CPC ... A01D 43/063; A01D 43/077; A01D 43/00; A01D 34/63; A01D 43/0631; A01G 1/12; A01G 1/125; A47L 5/14; A47L 5/365; A47L 9/149; A47L 9/1409; E01H 1/0836; E01H 1/0827
USPC ........... 56/2, 202, 203, 16.6, 12.8, 12.9, 16.9; 15/344, 347, 352, 79.2
See application file for complete search history.

(56) References Cited

U.S. PATENT DOCUMENTS

| | | | |
|---|---|---|---|
| 3,624,989 A | 12/1971 | Gatheridge | |
| 3,708,968 A | 1/1973 | Enters | |
| 3,952,484 A | 4/1976 | Van Swearingen | |
| 3,961,467 A | 6/1976 | Carpenter | |
| 4,233,806 A | 11/1980 | Richardson | |
| 4,941,231 A | 7/1990 | Jarosak | |
| 5,195,310 A * | 3/1993 | Kettler et al. | 56/202 |
| 5,685,134 A * | 11/1997 | Thornburg | 56/12.9 |
| 5,983,613 A | 11/1999 | Winter | |
| 6,105,350 A * | 8/2000 | Vachon et al. | 56/202 |
| 6,178,592 B1 * | 1/2001 | Whitney | 15/347 |
| 6,574,829 B1 * | 6/2003 | Marcum et al. | 15/347 |
| 7,047,718 B2 | 5/2006 | Caroni | |
| 7,611,554 B2 * | 11/2009 | Whitney | 55/361 |
| 7,962,996 B1 | 6/2011 | Mondello | |
| 7,987,548 B1 * | 8/2011 | Hays | 15/327.5 |

* cited by examiner

*Primary Examiner* — Robert Pezzuto
(74) *Attorney, Agent, or Firm* — CreatiVenture Law; Linda L. Lewis

(57) ABSTRACT

An attachment for a lawn device with a debris discharge opening having a transfer tube that carries the lawn debris generally upward to an air permeable fill chute which directs the debris into the collector bag; the fill chute allowing the air carrying the debris to vent, yet sufficiently enclosed to contain lawn debris; and the fill chute being flexible, allowing the collector bag to overfill, so that the operator of the device does not have to stop as often to either empty the bag or to tamp down debris into the bag.

20 Claims, 18 Drawing Sheets

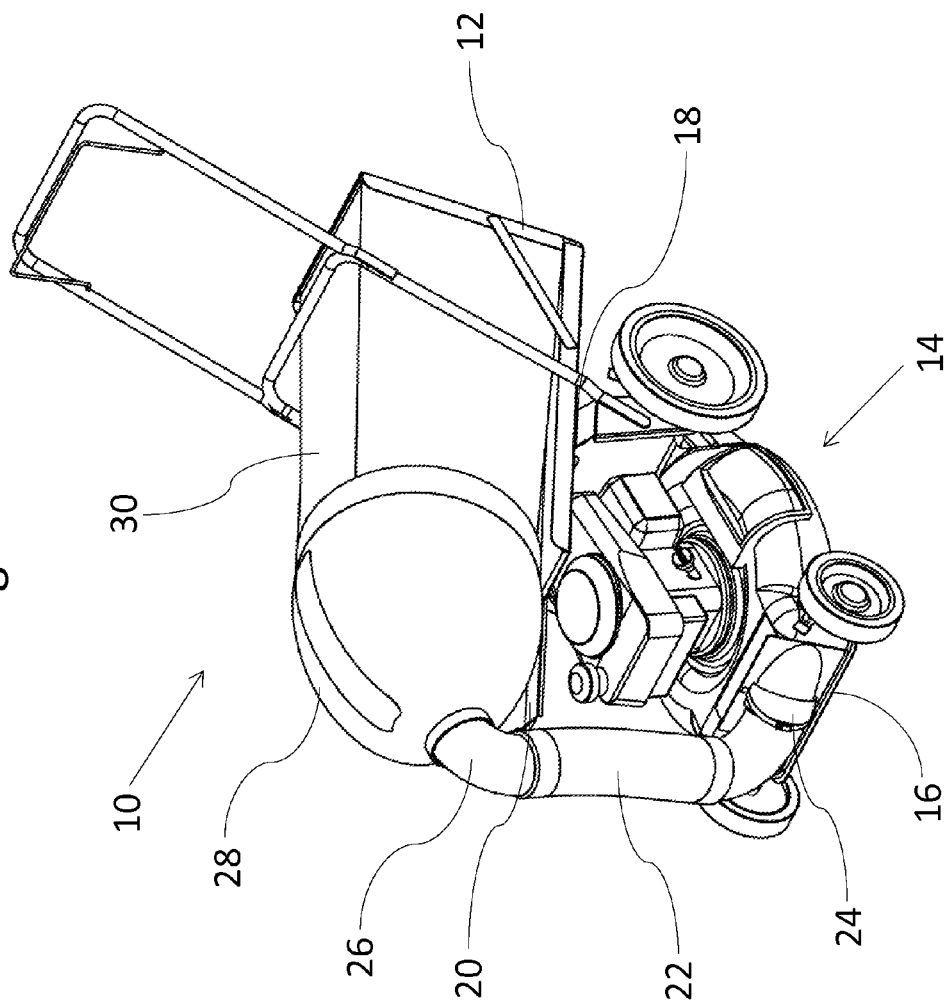

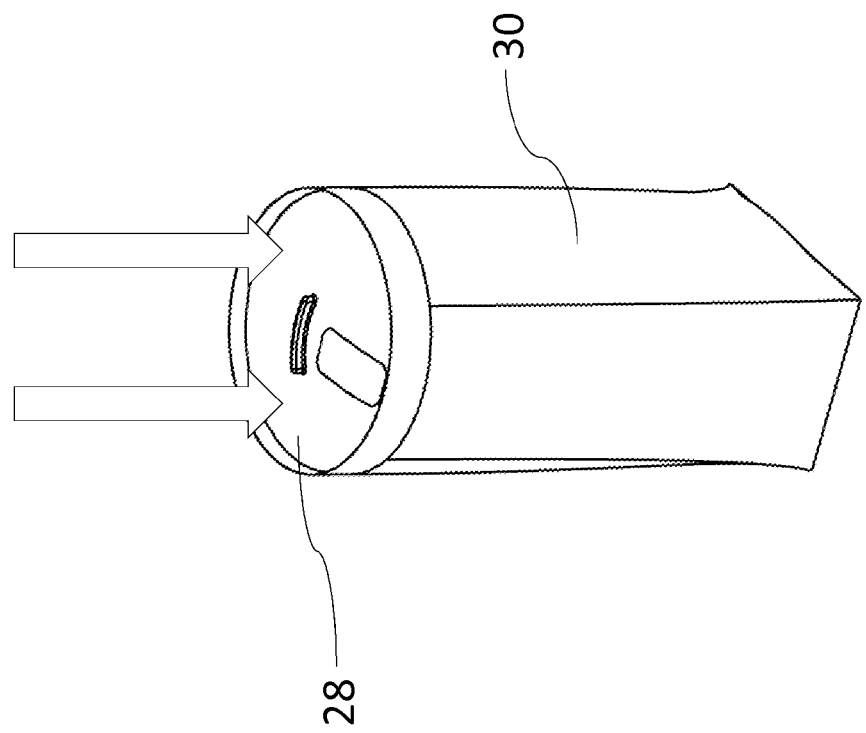

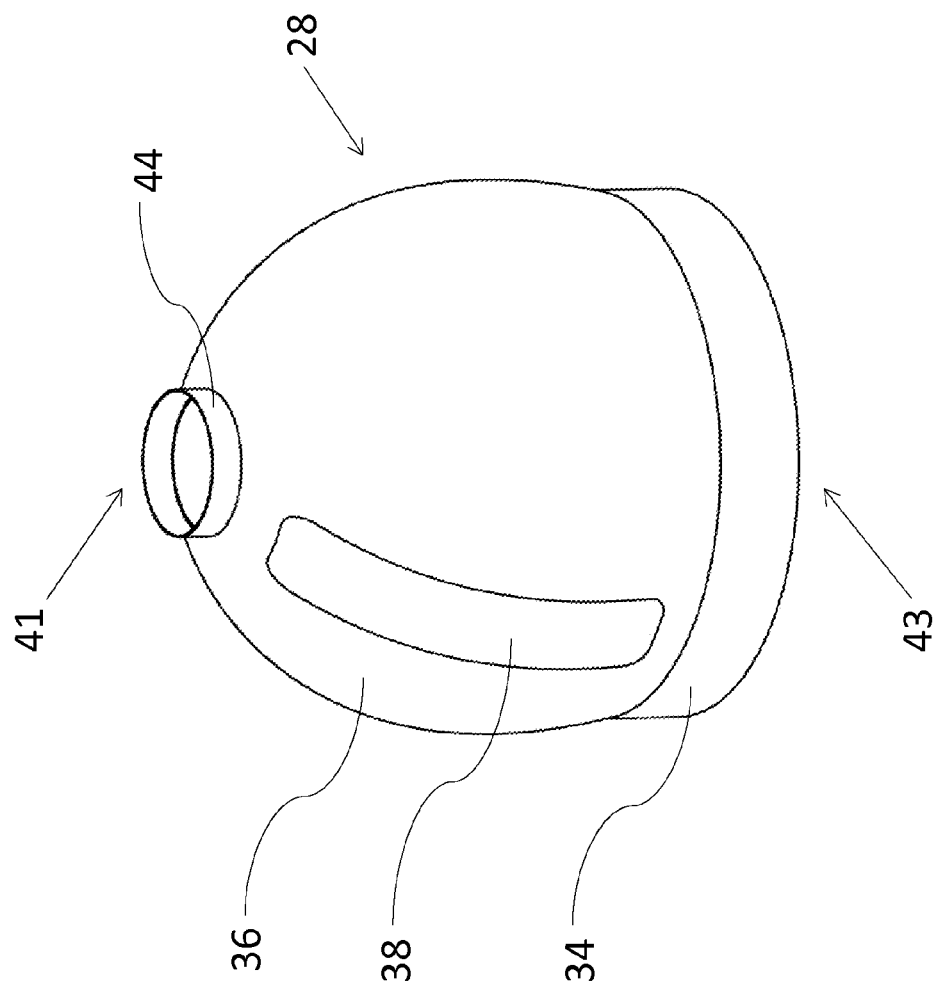

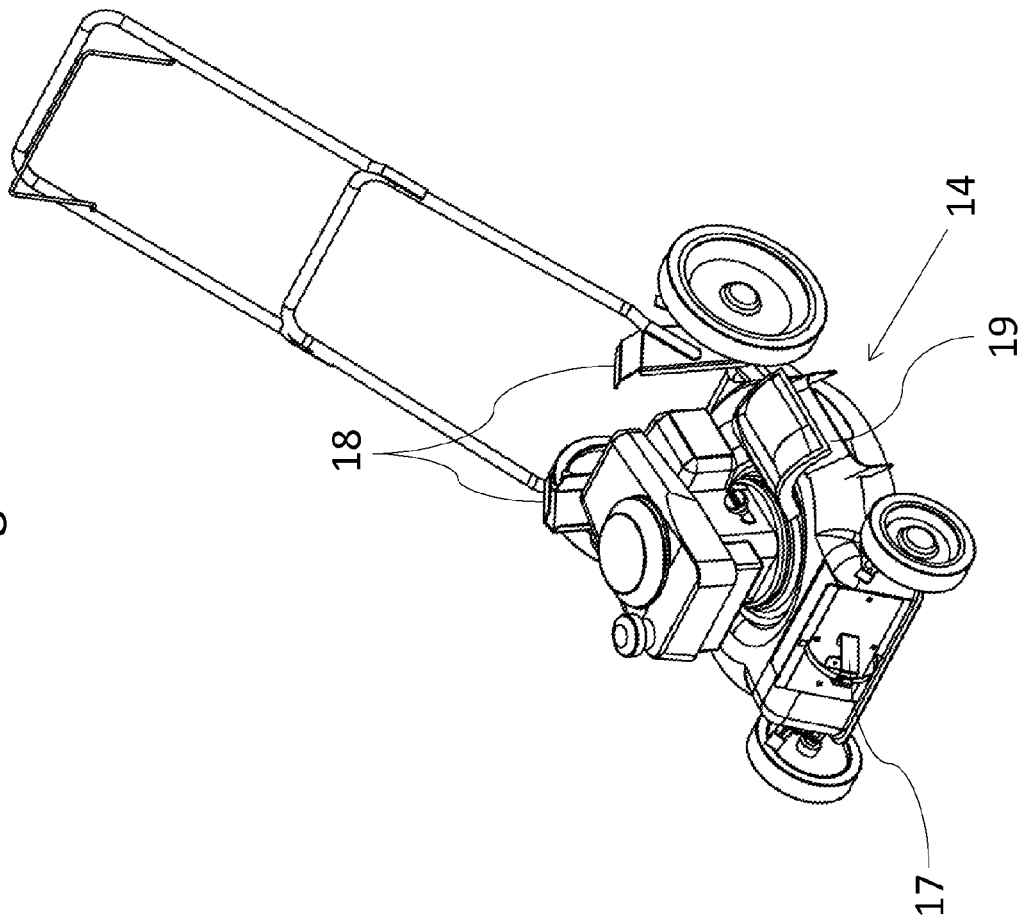

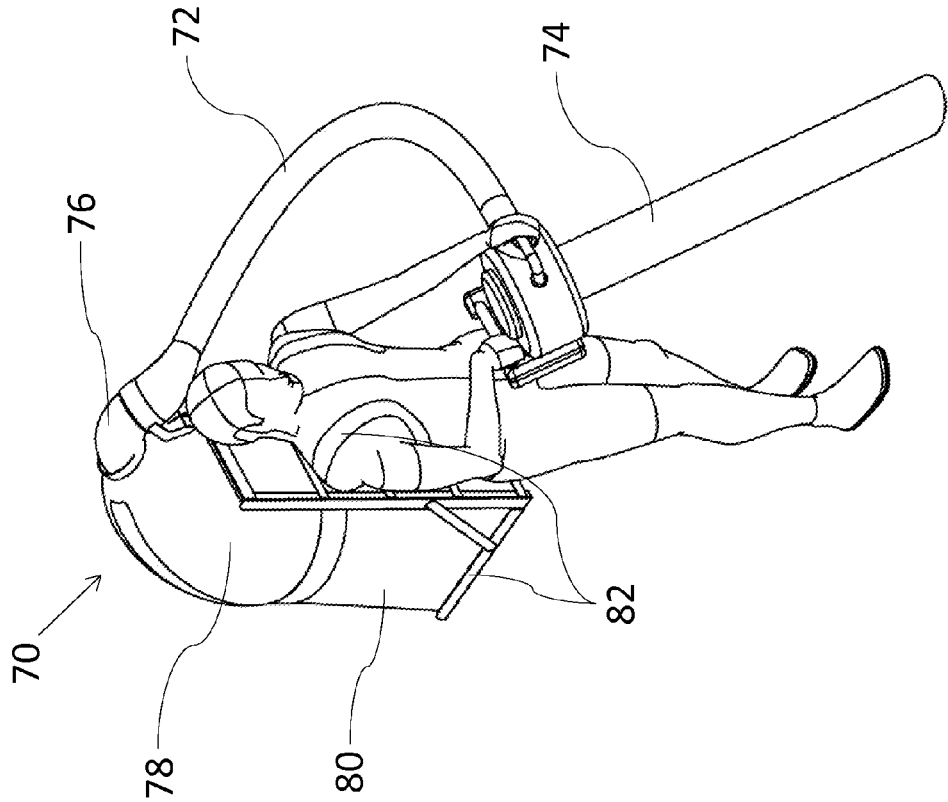

LAWN EQUIPMENT ATTACHMENT

CROSS-REFERENCE TO RELATED APPLICATIONS

This application claims the benefit of provisional patent application 61/616,042, filed Mar. 27, 2012, which is hereby incorporated by reference.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to attachments to rotary lawn mowers, riding lawn mowers, handheld leaf vacuums and other lawn care devices, and more particularly to an attachment to a lawn mower that collects and bags lawn debris.

2. Related Art

The present invention is an attachment for rotary lawn mowers, riding lawn mowers, leaf blowers/vacuums, and other lawn-care devices that have a debris discharge opening. The attachment includes a transfer tube that carries the lawn debris from the device discharge opening generally upward to a fill chute which directs the debris into the collector bag. The fill chute is flexible and air permeable, allowing the air carrying the debris to vent, yet is sufficiently enclosed to contain lawn debris. When used to collect fall leaves, the flexible fill chute can hold overfill leaves thereby allowing the collector bag to overfill. The operator of the lawn mower does not have to stop as often to either empty the bag or to tamp down the leaves into the bag. When the fill chute is sufficiently full, the operator stops mowing, removes the bag with fill chute attached, tamps the debris into the collector bag, and removes the fill chute. The filled bag is disposed of and an empty bag is placed in the attachment.

The attachment is optionally adjustable to at least two positions. In the fall, it can be adjusted to the collect leaves (CL) position that includes a larger collection bag and a higher positioning allowing the bag to be overfilled. In the spring and summer, the attachment is adjusted to the collect grass clipping (CG) position. This position includes a smaller, shorter collection bag for the more dense grass clippings. If a larger bag is filled with grass clippings, it becomes too heavy to be lifted and moved, so a smaller bag is used. The CG position also involves a lower positioning of the inlet adapter and transfer tube which improves the line of sight of the user while mowing, as well as easier filling of the bag and less clogging with dense fresh grass clippings.

Related art disclose attachments for a rotary lawn mower that include a top-filling collection bag for lawn waste. These devices typically have a tube that attaches upwardly the discharge outlet of a rotary lawn mower to an opening at the top of the collection bag. The debris falls into the bag and collects there. A venting system is used to vent the moving air that carries the debris upward. Some devices that fall into this general category are disclosed in U.S. Pat. Nos. 3,624,989, 3,708,968, 3,961,467, 4,941,231 and 5,983,613.

U.S. Pat. No. 3,952,484 discloses a collector that has a release air filter at the top of the collector bag. The '484 patent does not disclose a fill chute that is air permeable and can be overfilled to increase the volume of lawn debris that can be collected without stopping the mower. U.S. Pat. No. 4,233,806 uses a permeable bag to vent air in its lawn mower attachment, but the bag is not positioned to catch lawn debris and does not provide extra volume to overfill the collecting bag. Related art devices fail to provide the means to ventilate air and overfill the collector bag with a fill chute and teach away from the present invention by using other ventilation means. None of the cited references disclose a device that does what the present invention does.

SUMMARY OF THE INVENTION

The present invention is an attachment for rotary lawn mowers, riding lawn mowers, handheld leaf vacuums, and other lawn-care devices that have a debris discharge opening. The attachment has a transfer tube that is equipped to sealingly engage with the discharge opening of the device, wherein the transfer tube is directed generally upward to a fill chute which is coupled to an opening in a collector bag. When the lawn mower is operating and discharging lawn debris, the debris is carried by discharge air generally upward to the fill chute and into the collector bag, or if the bag is already full, it overfills the fill chute. Because the fill chute is able to overfill, the operator can stop less frequently to empty or tamp the debris into the bag. When the fill chute is sufficiently full of debris, the operator can stop and tamp the debris, thoroughly filling the collector bag. The filled bag is removed and replaced with an empty bag.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1a is an isometric view drawing of the attachment of the present invention mounted on a rotary mower in the leaf collecting position.

FIG. 2c is a perspective drawing of the fill chute and collector bag after final tamping of fill chute leaves into the collector bag.

FIG. 3b is an isometric view drawing of the fill chute.

FIG. 4c is an isometric view drawing of a rotary mower with the attachment of the present invention removed, with mulching plate covering the front discharge and with a side discharge adapter attached.

FIG. 7a is an isometric view drawing of a user of a handheld leaf vacuum with the attachment of the present invention held on the user's back in a backpack.

DETAILED DESCRIPTION OF THE PREFERRED EMBODIMENTS

The following description of the preferred embodiment(s) is merely exemplary in nature and is in no way intended to limit the invention, its application, or uses.

Figure 1B:
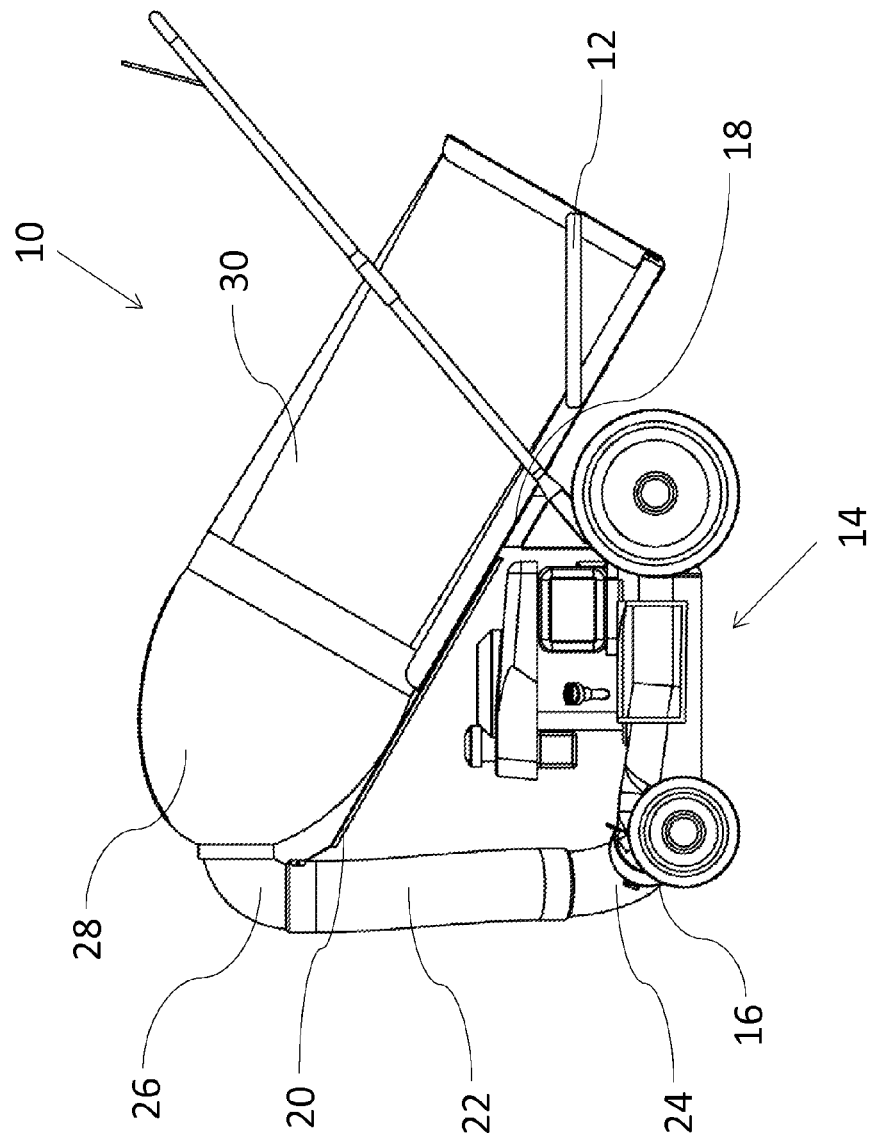
FIG. 1b is a side view drawing of the attachment of the present invention mounted on a rotary mower in the leaf collecting position.

FIGS. 1a and 1b are perspective views of an embodiment of the lawn mower attachment 10 on a rotary push lawn mower 14. In a preferred embodiment, as shown in FIGS. 1a, 1b, 4a, 4b, 4c, 5a and 5b, the lawn mower 14 is modified so that the rear discharge opening is moved 180 degrees to become a front discharge opening 16. Additionally, a rear attachment mounting surface 18 is added to the lawn mower 14. The attachment 10 has a large collector bag 30 supported by a frame 12. Frame 12 is releasably attached to the mounting surface 18 of the lawn mower 14. The bag 30 can be any suitable bag, including a 30 gallon disposable paper yard waste bag, a plastic disposable bag, or a permanent bag such as a cloth bag.

Optionally, the attachment 10 is adjustable to at least two positions: the leaf collecting (LC) position and the grass clipping collecting (GC) position. In FIGS. 1a and 1b, the attachment is shown in the LC position. This means that a larger bag is used as the collector bag 30. The larger bag is used to collect leaves, because leaves are less dense than fresh grass clippings, and a larger volume of them can be collected and easily moved in a bag.

The attachment 10 is adjustable by means of the inlet adapter arm 20, which is slidably attached to the frame 12. In the LC position, the inlet adapter arm 20 is extended out, thereby providing more room for the large collector bag 30, and extending generally upward the transfer tube 22. In the GC position, the inlet adapter arm 20 is retracted to better accommodate the small collector bag 31 and curving the transfer tube 22 to provide a smaller angle of entry into the fill chute 28.

Figure 5A:
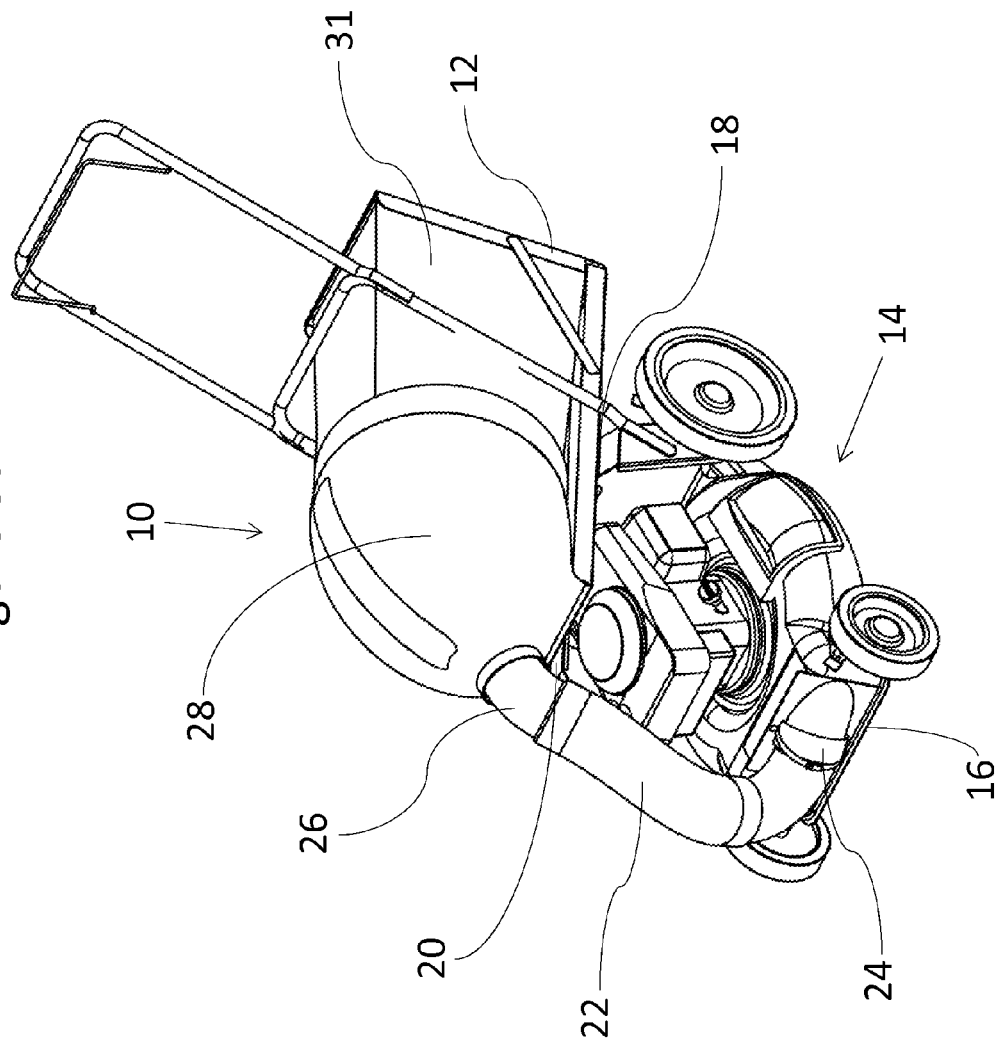
FIG. 5a is an isometric view drawing of the attachment of the present invention mounted on a rotary mower in the CG position.
Figure 5B:
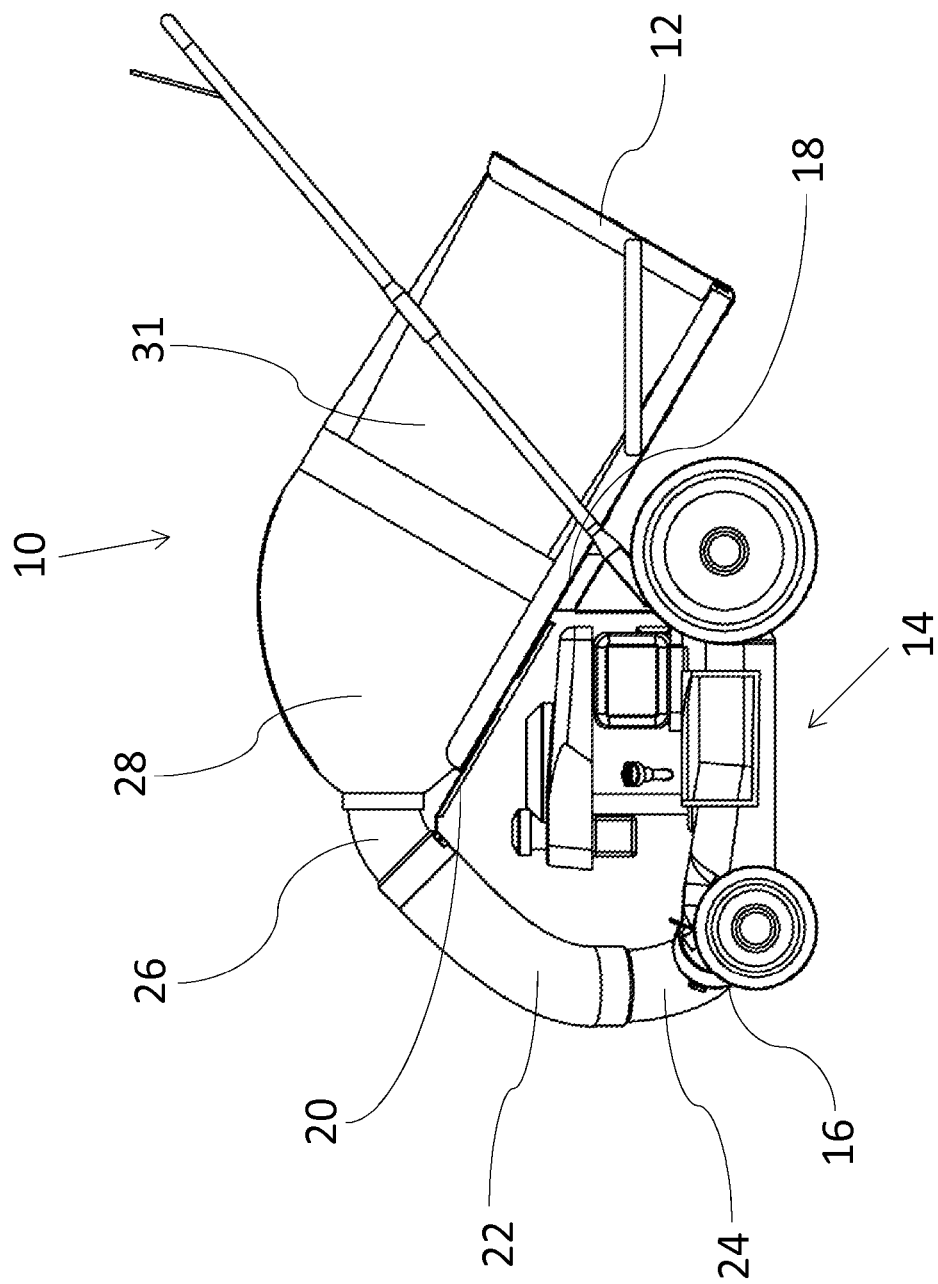
FIG. 5b is a side view drawing of the attachment of the present invention mounted on a rotary mower in the CG position.

In FIGS. 5a and 5b, the attachment is shown in the GC position. This means that a smaller collecting bag 31, which is from about ½ to ⅔ the size of the large collecting bag 30 is used. It also involves a lower positioning of the fill chute and transfer tube, because of the shortened bag. This improves the line of sight of the user while mowing, as well as easier filling of the bag because the clippings have to travel a shorter vertical distance.

As shown in FIGS. 1a, 1b, 5a and 5b, the inlet adapter 26 directs the yard debris to the fill chute 28. The inlet adapter 26 can be a PVC elbow with a diameter of from about 2 to 6 inches and its degree of bend may vary. The inlet adapter engages releasably with the fill chute 28. The fill chute 28 directs the yard debris to the collector bag 30. The flexible band 34 of the fill chute 28 inserts connectingly inside of the collector bag 30, thereby directing the lawn debris into the bag. The collector bag 30, which is typically made from flexible paper, plastic, or fabric, is supported and held in place by the frame 12. The frame 12 is made to structurally support the collector bag, and can be constructed out of generally inflexible support material, including metal, plastic, cardboard or wood. The frame 12 surrounds and supports the collector bag 30 and can be totally enclosed or merely a framework with openings small enough to provide structural support to the collector bag 30. The frame 12 connects attachment 10 to the lawn mower 14 at attachment mounting surface 18 and provides a supportive structure for the transfer tube 22 and the fill chute 28.

Figure 3A:
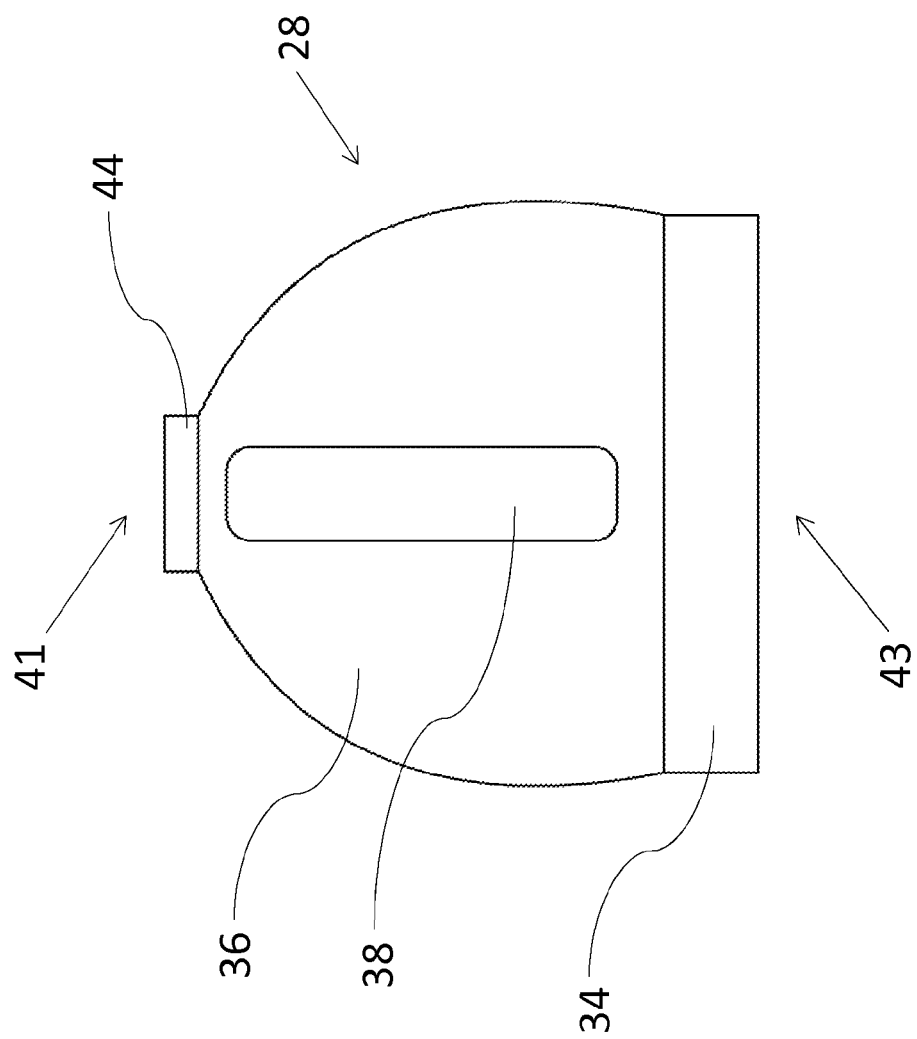
FIG. 3a is a side perspective view drawing of the fill chute.

FIGS. 3a and 3b are an embodiment of the fill chute 28. The fill chute top 41 has a releasable engaging means such as a draw cord with releasable cord locks (not shown), an elastic band or a metal or plastic clasp which forms the inlet adapter coupling 44. In a preferred embodiment, the engaging means is a draw string that is free to move within a sleeve around the perimeter of the fill chute top 41. The inlet adapter coupling 44 is sized to sealingly engage the inlet adaptor 26. In a preferred embodiment the fill chute is made from an air permeable fabric 36, such as woven cloth, and more preferably, is made from a bed sheet. Optionally, the fabric 36 has a transparent portion 38 that acts as window to see inside the fill chute without opening it. In a preferred embodiment, the fill chute bottom 43 consists of a flexible band 34 that is inserted into a sleeve at the perimeter of the bottom of the chute 43. The flexible band is designed to fit snugly inside the collector bag 30, forming a circular seal between the chute and the bag with a friction fit inside the bag.

Figure 2A:
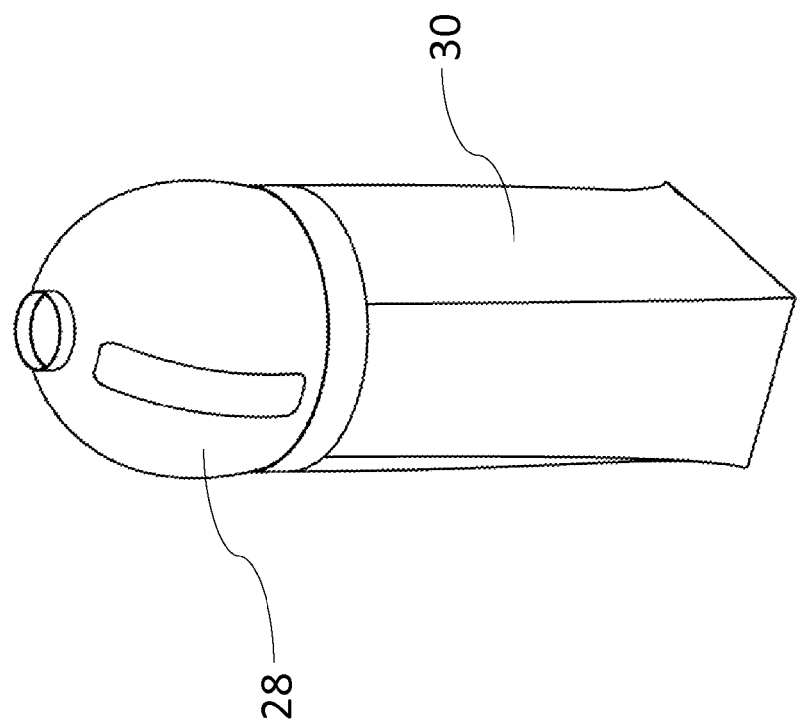
FIG. 2a is a perspective drawing of the fill chute and collector bag overfilled with leaves as removed from yard equipment.
Figure 2B:
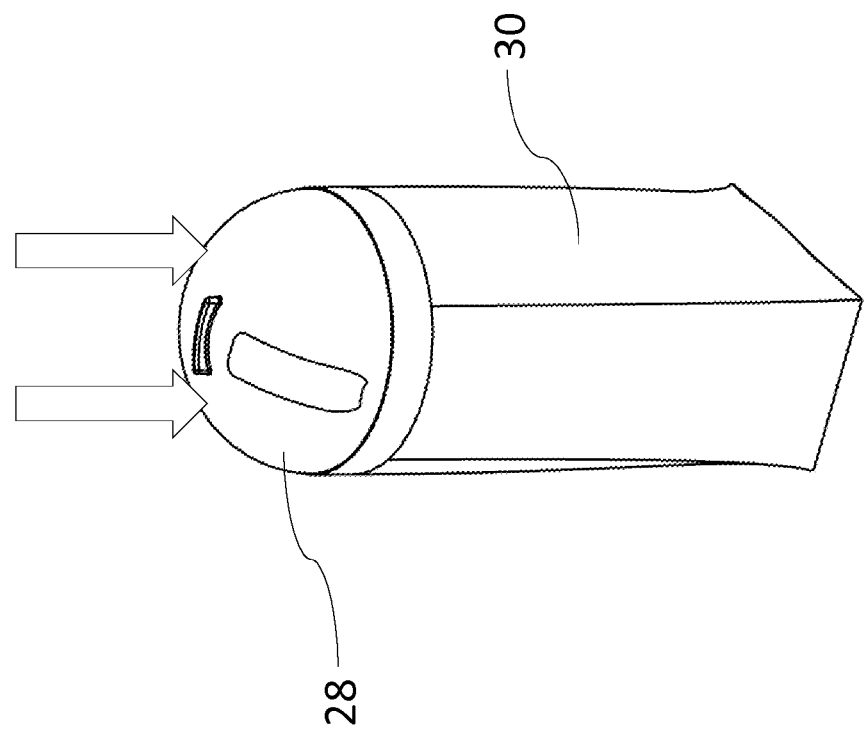
FIG. 2b is a perspective drawing of the fill chute and collector bag after initial tamping of fill chute leaves into the collector bag.
Figure 2D:
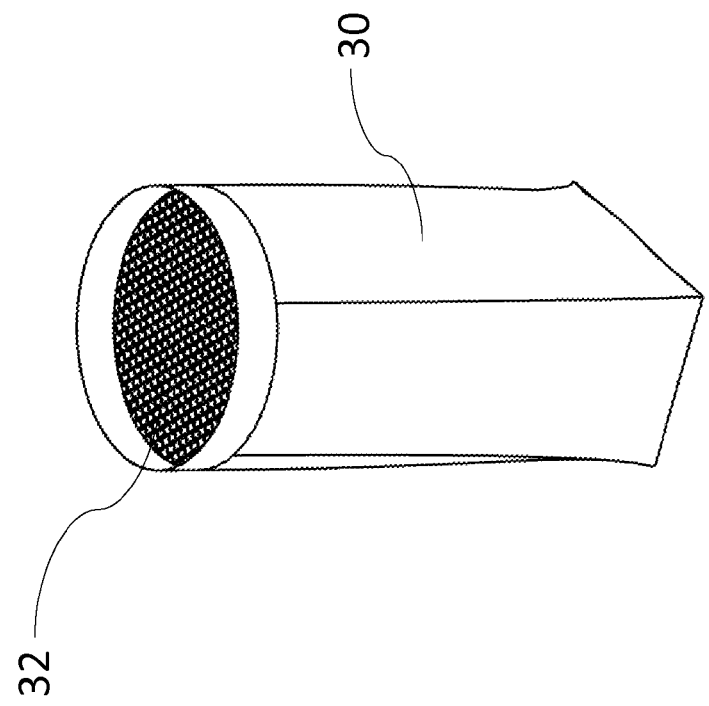
FIG. 2d is a perspective drawing of the fully tamped collector bag after the fill chute has been removed.

As shown in FIGS. 2a, the collector bag 30 and the fill chute 28 can both be filled. The fill chute 28 can be disengaged from the inlet adapter 26 and the engaged collector bag 30 and fill chute 28 removed from frame 12. External force is applied to the fill chute 28 to tamp down the yard debris 32 as shown in FIGS. 2b and 2c. The fill chute 28 is removed from the filled, tamped collector bag 30, as shown in FIG. 2d. A new, empty collector bag 30 is attached to the fill chute 28 and placed in the frame 12.

FIG. 5 is an embodiment of the attachment 10 attached to a push rotary lawn mower 14, wherein the attached is in the GC position. A full sized bag 30 will not be desired for heavy, dense grass clippings, while the shortened bag 31 creates a better line-of-sight that is important for grass cutting. The exit angle of the inlet adapter 26 into the fill chute 28 can be adjusted to project the grass clippings toward the top and back of the yard bag 31, alleviating the steep angle of repose grass buildup along the length of the bag. Additionally, the discharge adapter 24 has been designed to work with the trajectory of the yard debris as it exits the front discharge 16, alleviating clogs. Furthermore, a quick-release coupling (not shown) may be used between the discharge adapter 24 and transfer tube 22 to facilitate expedient clearing of clogs should they occur.

Most grass catcher bags utilize a mesh at the rear of the bag to dissipate discharge air. This is poor for several reasons. The initial yard debris immediately covers the mesh, reducing air flow, inhibiting yard debris flow into the bag. As additional yard debris continues to fill the bag, air flow is further reduced, further inhibiting yard debris flow into the bag. Using the attachment of the present invention, yard debris does not immediately build up against the fill chute 28, permitting more consistent air flow and less inhibited debris flow as the bag is filled. Additionally, the dissipation surface area for the fill chute (generally cylindrical) is larger than the traditional grass catcher mesh (rectangle), further improving fill dynamics.

Figure 4A:
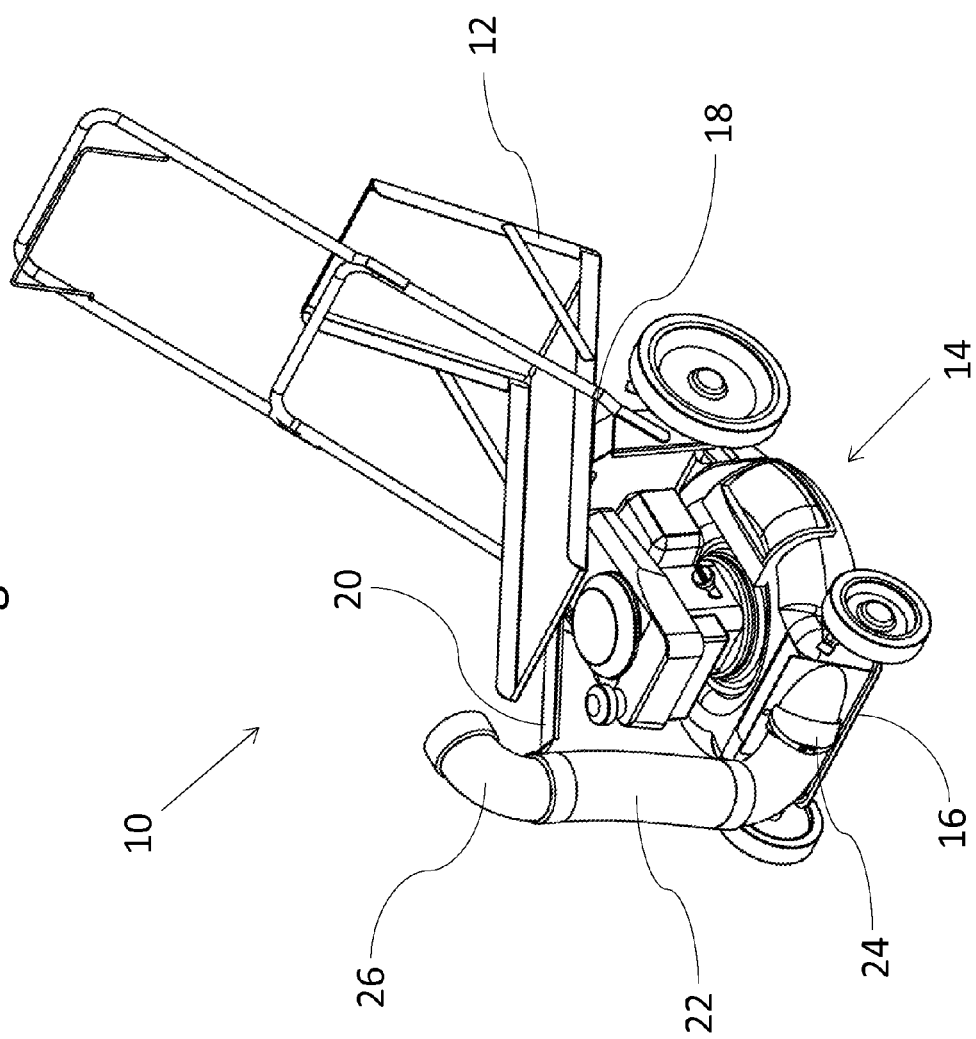
FIG. 4a is an isometric view drawing of the attachment of the present invention mounted on a rotary mower in the CL position with the fill chute and collector bag removed
Figure 4B:
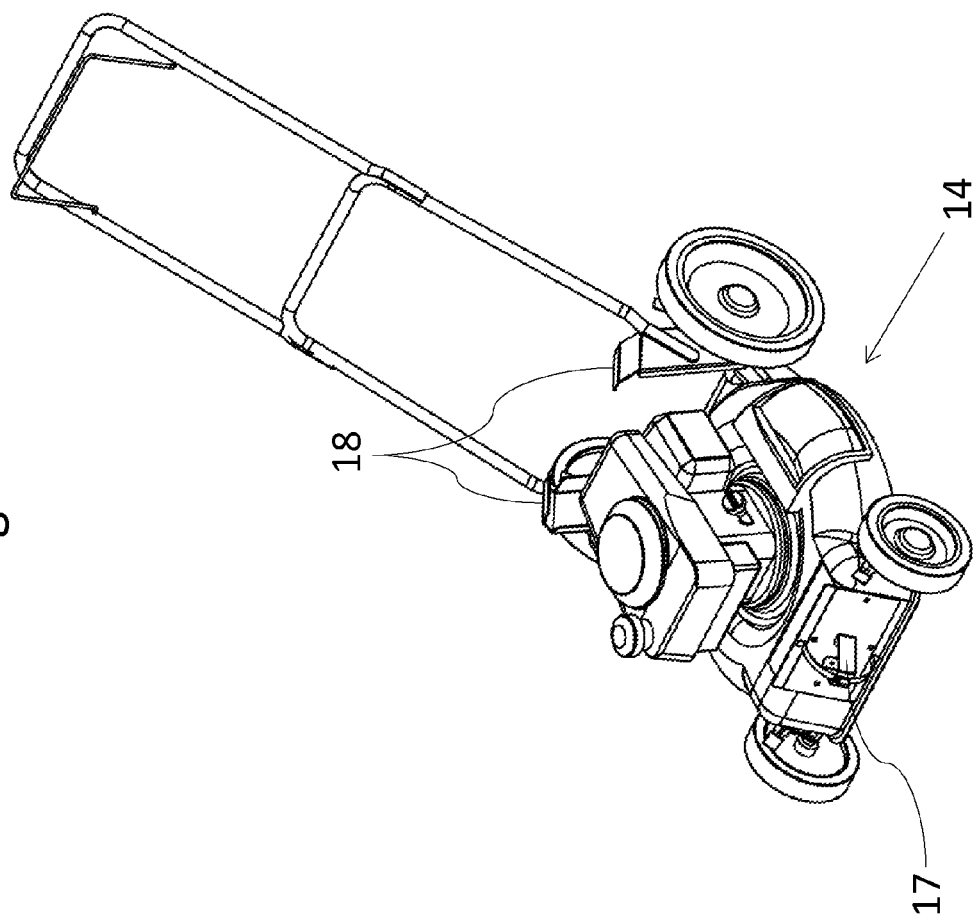
FIG. 4b is an isometric view drawing of a rotary mower with the attachment of the present invention removed and with mulching plate covering the front discharge.

As shown in FIGS. 4a and 4b, the attachment 10 can be removed from the push rotary mower 14 in the event that it is desirable that the lawn debris not be collected and bagged, but rather mulched. As shown in FIG. 4b, a mulch plate 17 can be placed over the front debris discharge opening 16, and the debris mulched. As shown in FIG. 4c, the mower 14 can be further adapted to operate with a side discharge opening 19.

Figure 6A:
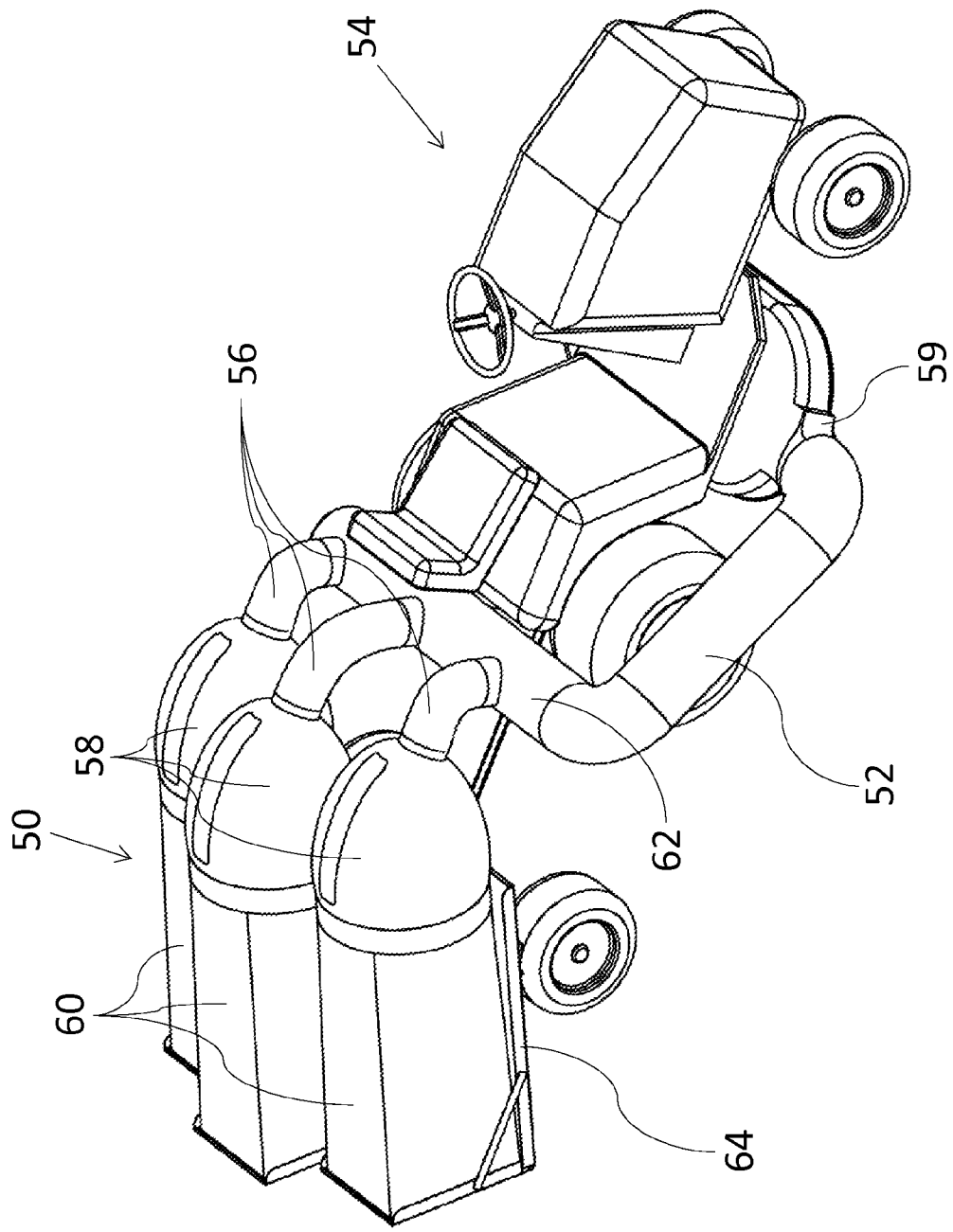
FIG. 6a is an isometric view drawing of the attachment of the present invention mounted on a riding lawn mower with a trailer.
Figure 6B:
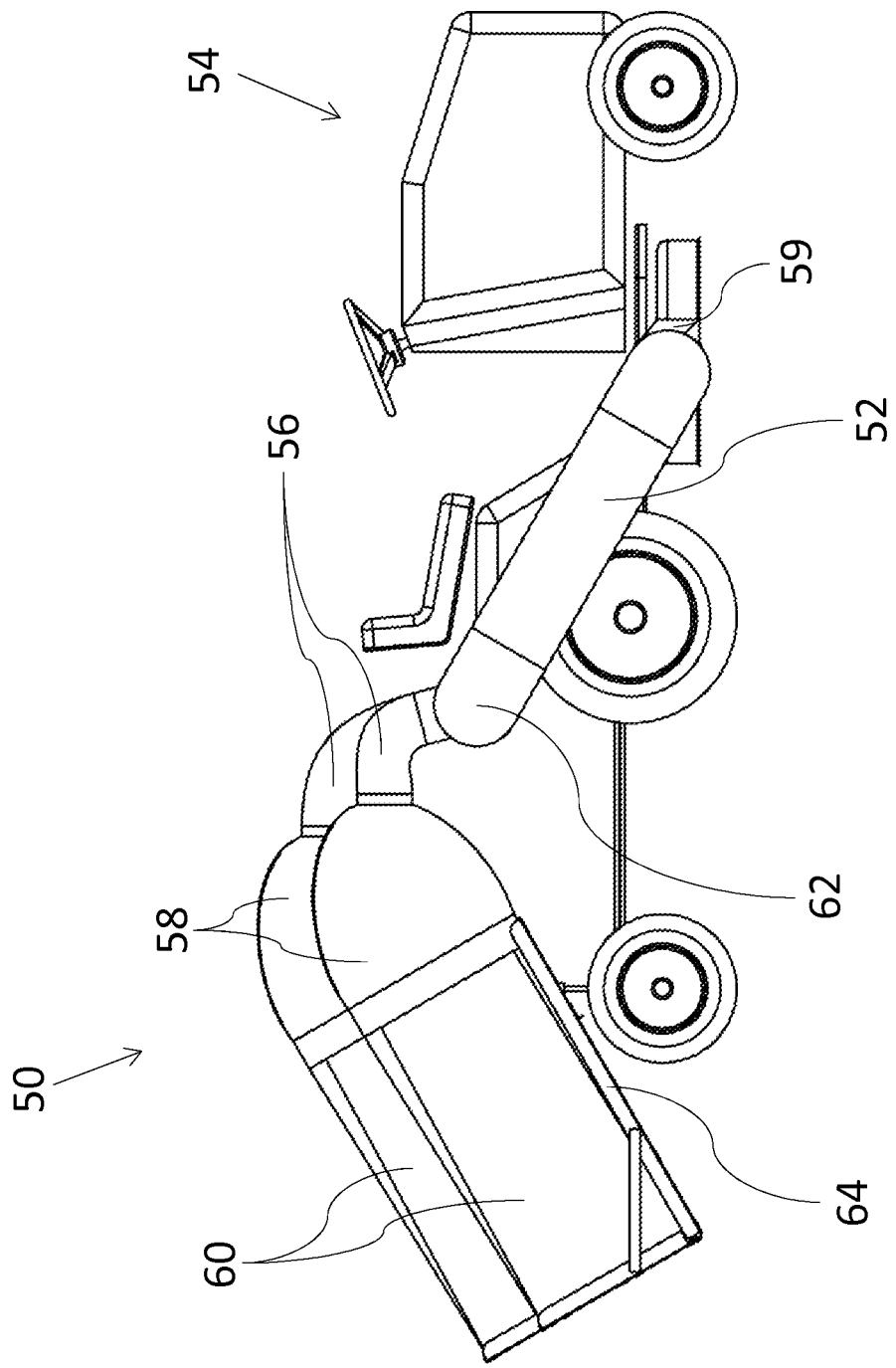
FIG. 6b is a side view drawing of the attachment of the present invention mounted on a riding lawn mower with a trailer.

In FIGS. 6a and 6b, another preferred embodiment of the present invention is shown. A riding lawn mower 54 is shown with the attachment 50 of the present invention. The riding lawn mower 54 has a side discharge opening 59 sealingly attached to the transfer tube 52. The transfer tube 52 is directed generally upward and is sealingly attached to the transfer manifold 62. The transfer manifold 62 is sealingly attached to at least one inlet adapter 56. Preferably, the attachment 50 has from two to four inlet adaptors 56, each sealingly attached to a fill chute 58, each of which is in turn attached to a collector bag 60. The collector bags 60 are supported and transported by a tow trailer 64 which is releasably attached to the riding lawn mower 54.

Figure 7B:
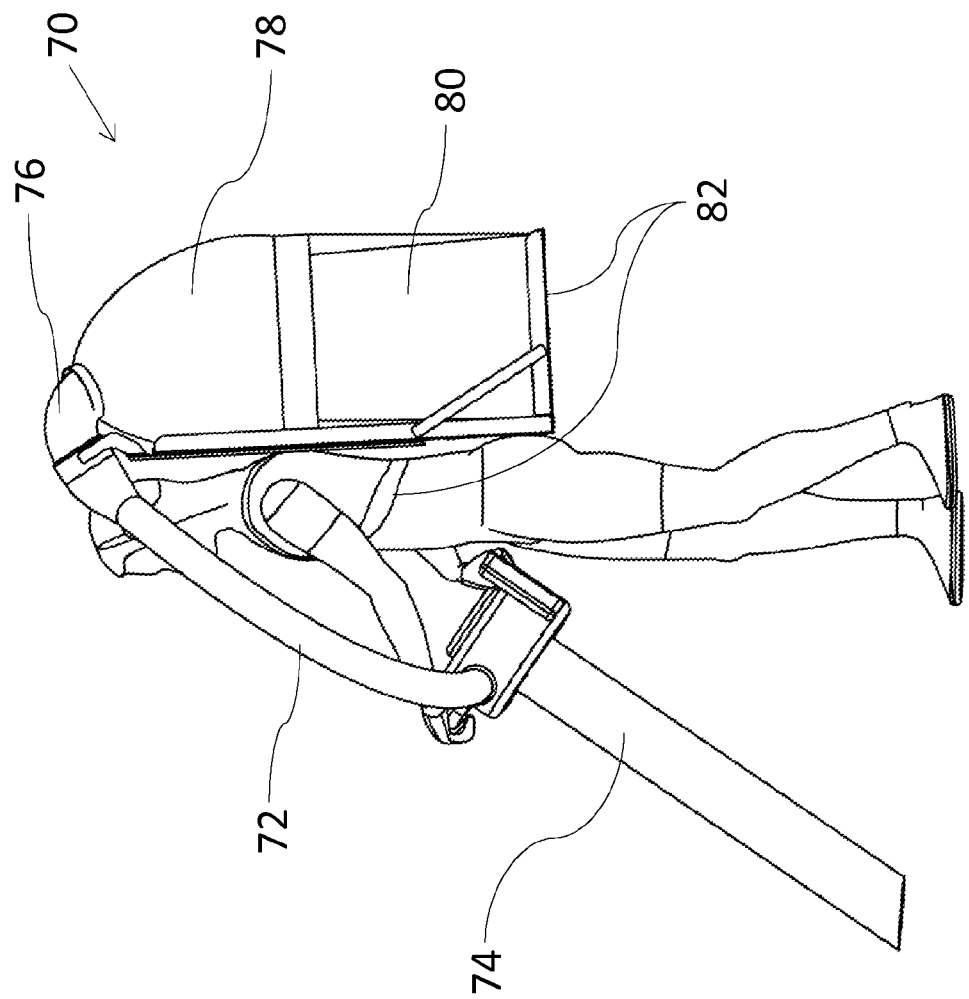
FIG. 7b is a side view drawing of a user of a handheld leaf vacuum with the attachment of the present invention held on the user's back in a backpack.

In FIGS. 7a and 7b, another preferred embodiment of the present invention is shown. The attachment 70 is used with a handheld leaf vacuum 74. The discharge outlet of the leaf vacuum is engaged sealingly with the transfer tube 72, which is directed generally upward. The transfer tube 72 is engaged sealingly with the inlet adaptor 76, which is engaged with the fill chute 78. The fill chute 78 is connected to the collector bag 80 which is held supportingly and carried with a backpack bag holder 82. The user is able to walk around vacuuming up leaves or debris and collect it in the collector bag 80.

Figure 8:
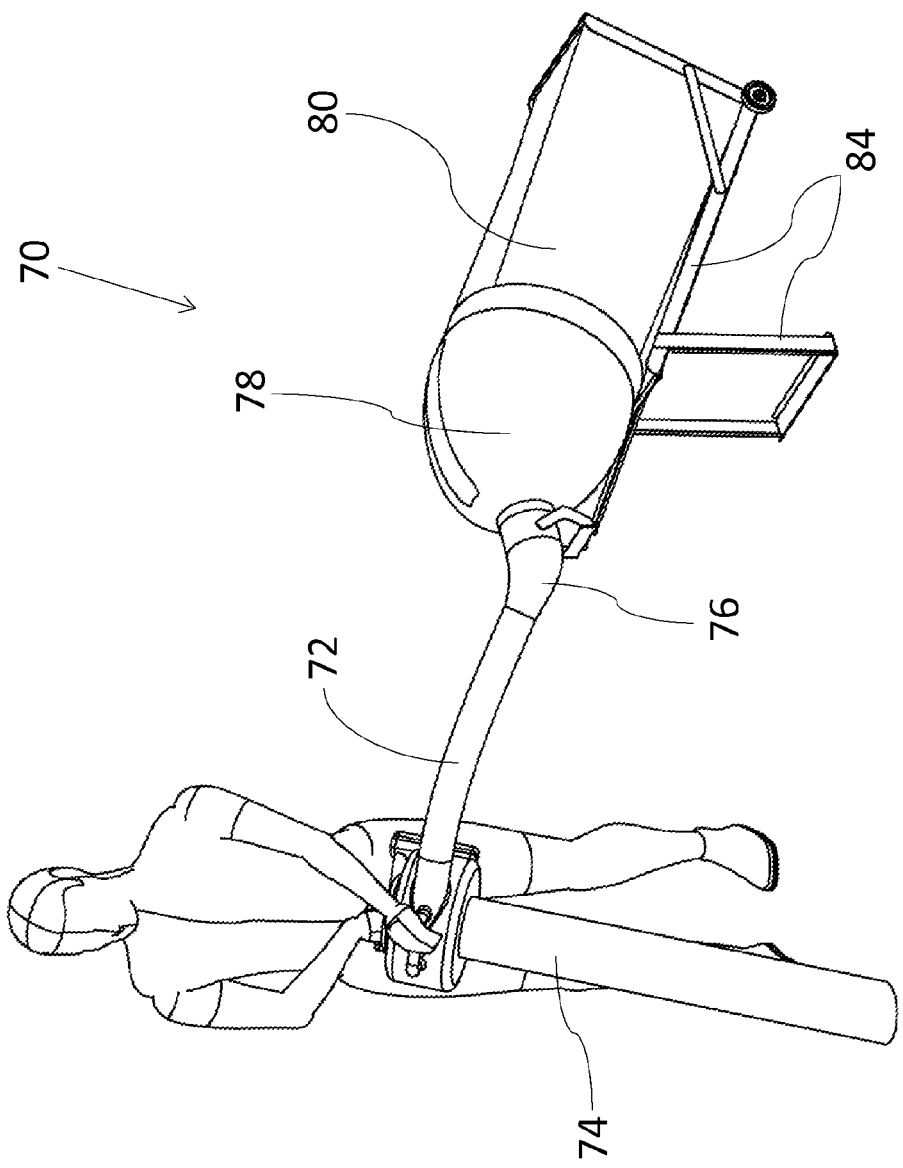
FIG. 8 is an isometric view drawing of a user of a handheld leaf vacuum with the attachment of the present invention in a standing bag frame.

In FIG. 8, another preferred embodiment of the present invention is shown. Similar to the embodiment of FIGS. 7a and 7b, attachment 70 is used with a handheld leaf vacuum 74. The discharge outlet of the leaf vacuum is engaged sealingly with the transfer tube 72, which is directed generally sideways. The transfer tube 72 is engaged sealingly with the inlet adaptor 76, which is engaged with the fill chute 78. The fill chute 78 is connected to the collector bag 80 which is held supportingly and carried in a standing bag frame 84. The user is able to walk around vacuuming up leaves or debris and collect it in the collector bag 80. Optionally, the standing bag frame 84 has wheels at the termini of its legs, allowing it to be rolled about. Further optionally, the bag frame 84 is placed in a cart that is rolled about.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An attachment for a rotary push lawn mower comprising:
   wherein the mower has a front debris discharge opening for discharging debris and a rear mounting surface;
   wherein the discharge opening is releasably engaged with a transfer tube having a first end and a second end;
   wherein the discharge opening is releasably engaged with the first end of the transfer tube and an inlet adapter coupling is releasably engaged with the second end;
   wherein the inlet adapter coupling is engaged with an air permeable flexible fill chute;
   wherein the air permeable flexible fill chute is removeably engaged with a collector bag;
   wherein debris from the debris discharge opening is directed by the transfer tube into the fill chute and the collector bag; and
   wherein the fill chute and the collector bag are positioned above the lawn mower and held there by a frame attached to the rear mounting surface on the lawn mower.

2. The attachment of claim 1, wherein between the discharge opening and the first end of the transfer tube is a discharge adapter.

3. The attachment of claim 1, wherein the attachment has a leaf collection (LC) position and a grass collection (GC) position.

4. The attachment of claim 3, wherein in the LC position, the collector bag is selected from the group consisting of a 30 gallon disposable paper bag, a plastic disposable bag, and a cloth bag, and in the GC position, the collector bag is selected from the group consisting of a bag from ½ to ⅔ the size of the 30 gallon disposable paper bag, a plastic disposable bag, and a cloth bag.

5. The attachment of claim 1, wherein between the second end of the transfer tube and the inlet adapter coupling is an inlet adapter.

6. A method of providing a filled tamped down bag of lawn debris comprising:
   releasably attaching a bag to a flexible permeable fill chute;
      wherein the fill chute is engaged with an inlet adapter coupling;
      wherein the inlet adapter coupling is releasably engaged with a transfer tube;
      wherein the transfer tube is releasably engaged with a discharge opening of a lawn device;
   operating a lawn device to pick up lawn debris;
   discharging the lawn debris through the discharge opening, through the transfer tube, and the inlet adapter coupling;
   filling the bag with lawn debris;
   filling the fill chute with lawn debris;
   stopping the lawn device;
   releasing the inlet adapter coupling from the transfer tube;
   applying an external force on the fill chute to tamp the lawn debris down into the bag; and
   releasing the bag from the fill chute to provide a filled tamped down bag of lawn debris.

7. The method of claim 6, wherein the device is selected from the group consisting of rotary lawn mowers, riding lawn mowers and handheld leaf vacuums.

8. The method of claim 6, wherein between the discharge opening and the transfer tube is a discharge adapter.

9. The method of claim 6, wherein between the transfer tube and the inlet adapter coupling is an inlet adapter.

10. The method of claim 6, wherein the attachment has a leaf collection (LC) position and a grass collection (GC)

position wherein in the LC position, the collector bag is selected from the group consisting of a 30 gallon disposable paper bag, a plastic disposable bag, and a cloth bag, and in the GC position, the collector bag is selected from the group consisting of a bag from ½ to ⅔ the size of the 30 gallon disposable paper bag, a plastic disposable bag, and a cloth bag.

11. A method of using an attachment to a lawn device having a debris discharge opening comprising:
the attachment having the discharge opening releasably engaged with one end of a transfer tube;
the transfer tube releasably engaged with an inlet adapter coupling;
the inlet adapter coupling engaged with an air permeable flexible fill chute;
the flexible fill chute removeably engaged with a collector bag;
wherein the attachment is used by:
operating the lawn device to pick up lawn debris;
discharging the lawn debris through the discharge opening, through the transfer tube, and through the inlet adapter coupling;
filling the bag with lawn debris;
filling the fill chute with lawn debris;
stopping the lawn device;
releasing the inlet adapter coupling from the transfer tube;
applying an external force on the fill chute to tamp the lawn debris down into the bag; and
releasing the bag from the fill chute to provide a tamped down bag of lawn debris.

12. The method of claim 11, wherein between the transfer tube and the inlet adapter coupling is an inlet adapter.

13. The method of claim 11, wherein the collector bag is supported and carried by a backpack bag holder.

14. The method of claim 11, wherein the collector bag is supported and carried by a standing bag frame.

15. The method of claim 14, wherein the standing bag frame has wheels that allow the standing bag frame to roll about.

16. The method of claim 11, wherein device is a riding lawn mower and the collector bags are supported and carried by a tow trailer attached to the riding lawn mower.

17. The method of claim 11, wherein the device is selected from the group consisting of rotary lawn mowers, riding lawn mowers and handheld leaf vacuums.

18. The method of claim 11, wherein the attachment has at least two positions.

19. The method of claim 11, wherein between the discharge opening and the transfer tube is a discharge adapter.

20. The method of claim 11, wherein the attachment has a leaf collection (LC) position and a grass collection (GC) position wherein in the LC position, the collector bag is selected from the group consisting of a 30 gallon disposable paper bag, a plastic disposable bag, and a cloth bag, and in the GC position, the collector bag is selected from the group consisting of a bag from ½ to ⅔ the size of the 30 gallon disposable paper bag, a plastic disposable bag, and a cloth bag.

* * * * *